(12) United States Patent
Braig et al.

(10) Patent No.: US 8,540,974 B2
(45) Date of Patent: Sep. 24, 2013

(54) AQUEOUS DISPERSIONS OF WATER-SOLUBLE AND/OR WATER-SWELLABLE ANIONIC POLYMERS, METHOD FOR THEIR PRODUCTION AND USE THEREOF

(75) Inventors: Volker Braig, Weinheim-Luetzelsachsen (DE); Werner Gauweiler, Lustadt (DE); Pulakesh Mukherjee, Mannheim (DE); Christian Hubert Weidl, Mannheim (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 950 days.

(21) Appl. No.: 11/573,210

(22) PCT Filed: Jul. 30, 2005

(86) PCT No.: PCT/EP2005/008276
§ 371 (c)(1),
(2), (4) Date: Feb. 5, 2007

(87) PCT Pub. No.: WO2006/018113
PCT Pub. Date: Feb. 23, 2006

(65) Prior Publication Data
US 2007/0212321 A1    Sep. 13, 2007

(30) Foreign Application Priority Data
Aug. 10, 2004 (DE) .................. 10 2004 038 983

(51) Int. Cl.
| A61K 8/81 | (2006.01) |
|---|---|
| A61Q 5/06 | (2006.01) |
| C08G 63/48 | (2006.01) |
| C08G 63/91 | (2006.01) |
| C08L 37/00 | (2006.01) |
| C08L 51/00 | (2006.01) |

(52) U.S. Cl.
USPC ........................................ 424/70.16; 525/74

(58) Field of Classification Search
USPC ........................................ 424/70.16; 525/74
See application file for complete search history.

(56) References Cited

U.S. PATENT DOCUMENTS

| 4,380,600 A * | 4/1983 | Hosoda et al. ............... 524/458 |
| 5,605,970 A | 2/1997 | Selvarajan |
| 5,750,614 A | 5/1998 | Hund et al. |
| 5,985,992 A | 11/1999 | Chen |
| 6,136,873 A * | 10/2000 | Hahnle et al. ............... 521/62 |
| 2002/0031532 A1* | 3/2002 | Uchiyama ............... 424/401 |

FOREIGN PATENT DOCUMENTS

| DE | 42 16 167 | 11/1993 |
| DE | 102 41 296 | 3/2004 |
| DE | 103 38 828 | 3/2005 |
| EP | 0 183 466 | 6/1986 |
| EP | 0 761 701 | 3/1997 |
| EP | 0 838 498 | 4/1998 |
| EP | 0 858 478 | 8/1998 |
| EP | 0 984 990 | 3/2000 |
| JP | P2002-212895 A | 7/2002 |
| JP | P2003-073565 A | 3/2003 |
| WO | 97 34933 | 9/1997 |
| WO | 03 046024 | 6/2003 |

* cited by examiner

*Primary Examiner* — Daniel Sullivan
*Assistant Examiner* — Trevor Love
(74) *Attorney, Agent, or Firm* — Oblon, Spivak, McClelland, Maier & Neustadt, L.L.P.

(57) ABSTRACT

Aqueous dispersions of water-soluble and/or water-swellable anionic polymers which are obtainable by free radical polymerization of ethylenically unsaturated, anionic monomers in an aqueous medium in the presence of at leas one stabilizer, the polymerization being carried out in the presence of at least one water-soluble polymer of the groups consisting of (a) graft polymers of vinyl acetate and/or vinyl propionate on (i) polyethylene glycols or (ii) polyethylene glycols or polypropylene glycols blocked at one or both terminal groups with alkyd carboxyl or amino groups, polyalkylene glycols, polyalkylene glycols blocked at one or both terminal groups with alkyl carboxy or amino groups and (b) water-soluble copolymers of (b1) nonionic monoethylenically unsaturated monomers, (b2) cationic monoethylenically unsaturated monomers and if appropriate (b3) anionic monoethylenically unsaturated monomers, the fraction of the interpolymerized cationic monomers being greater than that of the anionic monomers, as a stabilizer, said aqueous dispersions are prepared by free radical polymerization of the anionic monomers in an aqueous medium in the presence of the abovementioned water-soluble polymers (a) and (b) and said aqueous dispersions are used as thickeners for aqueous systems.

20 Claims, No Drawings

AQUEOUS DISPERSIONS OF WATER-SOLUBLE AND/OR WATER-SWELLABLE ANIONIC POLYMERS, METHOD FOR THEIR PRODUCTION AND USE THEREOF

The present invention relates to aqueous dispersions of water-soluble and/or water-swellable anionic polymers which are obtainable by free radical polymerization of anionic monomers in an aqueous medium in the presence of at least one stabilizer, their preparation and their use as thickeners for aqueous systems.

U.S. Pat. No. 4,380,600 discloses a process for the preparation of aqueous dispersions of water-soluble polymers, water-soluble monomers which form water-soluble polymers being polymerized in an aqueous solution of at least one other polymer, such as polyethylene glycol, polyvinylpyrrolidone or starch, in the presence of free radical initiators. The aqueous solution of the other polymer, which is initially taken in the polymerization, comprises from 3 to 150 parts by weight of the water-soluble polymer, based on 100 parts by weight of water. The amount of the water-soluble monomers used in the polymerization, such as acrylic acid, sodium acrylate or acrylamide, is from 10 to 150 parts by weight, based on 100 parts by weight of water. In order to increase the stability of the resulting aqueous dispersions of water-soluble polymers, the polymerization can additionally be carried out in the presence of surfactants and, if required, also in the presence of water-soluble inorganic salts, such as sodium chloride or potassium sulfate.

EP-A-0 183 466 discloses a process for the preparation of aqueous dispersions of water-soluble polymers, the water-soluble monomers being polymerized in an aqueous solution which comprises a salt, e.g. ammonium sulfate, and a polymeric dispersant, e.g. a polyol, polyethylene glycol and/or polypropylene glycol having a molecular weight of up to 600, or a cationic or anionic polyelectrolyte. With the exception of homopolymers of specific cationic monomers, homopolymers of ionic monomers cannot be prepared by this process, cf. EP-A-0 183 466, page 5, lines 2 to 6. As shown in the examples, however, copolymers of acrylamide and acrylic acid can be prepared.

U.S. Pat. No. 5,605,970 discloses a process for the preparation of aqueous dispersions of high molecular weight anionic polymers. In this process, an aqueous solution of acrylic acid is polymerized with addition of from 2 to 20% by weight of ammonium sulfate, glycerol, ethylene glycol and a low molecular weight terpolymer of 66 mol % of acrylic acid, 22 mol % of sodium acrylate and 12 mol % of ethylhexyl acrylate in the presence of from 3 to 14 mol % of ethylhexyl acrylate and a polymerization initiator at a pH below 4.5 with formation of an aqueous dispersion of a high molecular weight terpolymer of acrylic acid, sodium acrylate and ethylhexyl acrylate. The terpolymer is isolated after cooling. In the known process, it is essential to use an inorganic salt and a hydrophobic monomer, such as ethylhexyl acrylate. However, the properties of the anionic polymers are modified in an undesirable manner as a result.

Moreover, aqueous dispersions of water-soluble polymers of N-vinylcarboxamides are known. They are prepared according to WO-A-03/046024 by polymerizing N-vinylcarboxamides in an aqueous medium in the presence of polymeric stabilizers, such as polyethylene glycol, polypropylene glycol, polyvinyl acetate, polyvinyl alcohol, polyvinylimidazole or polydiallyldimethylammonium chloride are obtained by polymerizing N-vinylcarboxamides in aqueous solutions which have high concentrations of inorganic salts, cf. the examples in EP-B-0 984 900.

WO-A-97/34933 discloses aqueous dispersions of high molecular weight nonionic or anionic polymers which are prepared by polymerization of the monomers in a saturated aqueous salt solution with addition of an anionic, water-soluble polymer stabilizer. Preferably used monomers are acrylamide and/or acrylic acid. Suitable polymer stabilizers are, for example, anionically charged water-soluble polymers having a molar mass of from 100 000 to 5 million such as polymers of acrylamidomethylpropanesulfonic acid. They are used in amounts of, for example, from 0.1 to 5 percent by weight, based on the total dispersion. During the polymerization, a pH of from 2 to 5 must be maintained.

Aqueous dispersions of water-soluble anionic polymers which comprise inorganic salts in dissolved form cannot, for example, be used as thickeners for aqueous systems, such as paper coating slips, because the inorganic salts greatly reduce the viscosity of the system to be thickened. This property is known as the salt poisoning effect.

Prior DE application 103 38 828.1 discloses aqueous dispersions of water-soluble anionic addition polymers obtainable by free-radical polymerization of ethylenically unsaturated anionic monomers in an aqueous medium in the presence of at least one stabilizer, wherein the stabilizer used is at least one water-soluble polymer from the groups consisting of (a) graft polymers of vinyl acetate and/or vinyl propionate on polyethylene glycols, polyethylene glycols blocked at one or both terminal groups with alkyl, carboxyl or amino groups, copolymers of alkyl polyalkylene glycol acrylates or alkyl polyalkylene glycol methacrylates and acrylic acid and/or methacrylic acid polyalkylene glycols having molar masses $M_N$ of from 1000 to 100 000, polyalkylene glycols blocked at one or both terminal groups with alkyl carboxyl or amino groups and having molar masses $M_N$ of from 11000 to 100 000
and
(b) hydrolyzed copolymers of vinyl alkyl ethers and maleic anhydride in the form of the free carboxyl groups and in the form of the salts at least partly neutralized with alkali metal hydroxides or ammonium bases, and/or of a water-soluble starch from the group consisting of cationically modified potato starch, anionically modified potato starch, degraded potato starch and maltodextrin.

The aqueous dispersions are used as thickeners for aqueous systems such as paper coating slips, pigment print pastes, cosmetic formulations and leather treatment compositions.

It is an object of the present invention to provide further aqueous dispersions of water-soluble anionic polymers in whose preparation no inorganic salts having a stabilizing effect need be used, so that the dispersions formed are virtually free of such salts.

We have found that this object is achieved, according to the invention, by aqueous dispersions of water-soluble and/or water-swellable anionic polymers which are obtainable by free radical polymerization of ethylenically unsaturated, anionic monomers in an aqueous medium in the presence of at least one stabilizer, if the polymerization is carried out in the presence of at least one water-soluble polymer from the group consisting of (a) graft polymers of vinyl acetate and/or vinyl propionate on
(i) polyethylene glycols or (ii) polyethylene glycols or polypropylene glycols blocked at one or both terminal groups with alkyl, carboxyl or amino groups, polyalkylene glycols, polyalkylene glycols blocked at one or both terminal groups with alkyl, carboxyl or amino groups and
(b) water-soluble copolymers of
(b1) nonionic monoethylenically unsaturated monomers,
(b2) cationic monoethylenically unsaturated monomers and if appropriate
(b3) anionic monoethylenically unsaturated monomers, the fraction of the interpolymerized cationic monomers being greater than that of the anionic monomers,
as a stabilizer.

Suitable ethylenically unsaturated, anionic monomers are, for example, monoethylenically unsaturated $C_3$- to $C_5$-carboxylic acids, such as acrylic acid, methacrylic acid, ethacrylic acid, crotonic acid, maleic acid, fumaric acid, vinylsulfonic acid, styrenesulfonic acid, acrylamidomethylpropanesulfonic acid, vinylphosphonic acid, itaconic acid and/or the alkali metal or ammonium salts thereof. The preferably used anionic monomers include acrylic acid, methacrylic acid, maleic acid and acrylamido-2-methylpropanesulfonic acid. Aqueous dispersions of polymers based on acrylic acid are particularly preferred. The anionic monomers can be polymerized either alone to give homopolymers or as a mixture with one another to give copolymers. Examples of these are the homopolymers of acrylic acid or copolymers of acrylic acid with methacrylic acid and/or maleic acid.

The polymerization of the anionic monomers can, however, also be carried out in the presence of other ethylenically unsaturated monomers. These monomers may be nonionic or may carry a cationic charge. Examples of such comonomers are acrylamide, methacrylamide, acrylic esters of monohydric alcohols of 1 to 20 carbon atoms, methacrylic esters of monohydric alcohols of 1 to 20 carbon atoms, vinyl acetate, vinyl propionate, dialkylaminoethyl (meth)acrylates, dialkylaminopropyl (meth)acrylates, diallyldimethylammonium chloride, N-vinylformamide, vinylimidazole and quaternized vinylimidazole. Basic monomers, such as dialkylaminoalkyl (meth)acrylates, e.g. dimethylaminoethyl acrylate or dimethylaminoethyl methacrylate, can be used both in the form of the free bases and in partly or completely neutralized form or in the form for example quaternized with $C_1$- to $C_{18}$-alkyl halides in the polymerization. The comonomers are used in the preparation of the anionic polymers, for example, in amounts such that the polymers formed are water-soluble and have an anionic charge. The amount of nonionic and/or cationic comonomers is, for example, from 0 to 99, preferably from 5 to 75, % by weight, based on the total amount of monomers used in the polymerization.

Preferred copolymers are, for example, copolymers of from 25 to 90% by weight of acrylic acid and from 75 to 10% by weight of acrylamide. Particular preference is given to homopolymers of acrylic acid which are obtainable by free-radical polymerization of acrylic acid in the absence of other monomers and also to copolymers of acrylic acid and/or methacrylic acid which are preparable by copolymerizing acrylic acid and/or methacrylic acid in the presence of pentaerythrityl triallyl ether, N,N'-divinylethylene-urea, at least doubly allyl-comprising allyl ethers of sugars such as sucrose, glucose or mannose or triallylamine and also mixtures thereof.

The polymerization may additionally be carried out in the presence of at least one crosslinking agent. Copolymers having a higher molar mass than on polymerization of the anionic monomers in the absence of a crosslinking agent are then obtained. The incorporation of a crosslinker in the polymers also leads to reduced solubility for the polymers in water. Depending on the amount of interpolymerized crosslinker, the polymers become insoluble yet swellable in water. There are fluid transitions between full solubility of the polymers in water and the swelling of the polymers in water. Crosslinked copolymers have a high water absorptivity because of their swellability in water. They can be used, for example, as thickeners for aqueous systems, such as paper coating slips.

Crosslinking agents which may be used are all compounds which have at least two ethylenically unsaturated double bonds in the molecule. Such compounds are used, for example, in the preparation of crosslinked polyacrylic acids such as superabsorbent polymers, cf. EP-A-0 858 478, page 4, line 30 to page 5, line 43. Examples of crosslinking agents are triallylamine, pentaerythrityl triallyl ether, methylenebisacrylamide, N,N'-divinylethyleneurea, at least doubly allyl-comprising allyl ethers or at least doubly vinyl-comprising vinyl ethers of polyhydric alcohols such as for example sorbitol, 1,2-ethanediol, 1,4-butanediol, trimethylolpropane, glycerol, diethylene glycol and of sugars such as sucrose, glucose, mannose, dihydric alcohols of 2 to 4 carbon atoms which are completely esterified with acrylic acid or methacrylic acid, such as ethylene glycol dimethacrylate, ethylene glycol diacrylate, butanediol dimethacrylate, butanediol diacrylate, diacrylates and dimethacrylates of polyethylene glycols having molecular weights of from 300 to 600, ethoxylated trimethylenepropane triacrylates or ethoxylated trimethylenepropane trimethacrylates, 2,2-bis(hydroxymethyl)butanol trimethacrylate, pentaerythrityl triacrylate, pentaerythrityl tetraacrylate and triallylmethylammonium chloride. If crosslinking agents are used in the preparation of the anionic dispersions, the amounts of crosslinking agent used in each case are, for example, from 0.0005 to 5.0, preferably from 0.001 to 1.0, % by weight, based on the total amount of monomers used in the polymerization. Preferred crosslinkers are pentaerythrityl triallyl ether, N,N'-divinylethyleneurea, at least doubly allyl-comprising allyl ethers of sugars such as sucrose, glucose or mannose and triallylamine and also mixtures thereof.

The polymerization can be carried out in the additional presence of at least one chain transfer agent. The polymers obtained have a lower molar mass than polymers prepared without chain transfer agent. Examples of chain transfer agents are compounds comprising sulfur in bound form such as dodecyl mercaptan, thiodiglycol, ethylthioethanol, di-n-butyl sulfide, di-n-octyl sulfide, diphenyl sulfide, diisopropyl disulfide, 2-mercaptoethanol, 1,3-mercaptopropanol, 3-mercaptopropane-1,2-diol, 1,4-mercaptobutanol, thioglycolic acid, 3-mercaptopropionic acid, mercaptosuccinic acid, thioacetic acid and thiourea, aldehydes, organic acids such as formic acid, sodium formate or ammonium formate, alcohols such as in particular isopropanol and also phosphorus compounds, an example being sodium hypophosphite. One or more chain transfer agents can be used in the polymerization. If they are used in the polymerization, they are used for example in an amount from 0.01% to 5.0% and preferably from 0.2% to 1% by weight, based on total monomers. The chain transfer agents are preferably used in the polymerization together with at least one crosslinker. By varying the amount and ratio of chain transfer agent and crosslinker it is possible to control the rheology of the resultant polymers. Chain transfer agent and/or crosslinker can be used in the polymerization by for example including it or them in the aqueous polymerization medium or metering it or them together or separately from the monomers into the polymerization batch at a rate commensurate with the progress of the polymerization.

Usually, initiators which form free radicals under the reaction conditions are used in the polymerization. Suitable polymerization initiators are, for example, peroxides, hydroperoxides, hydrogen peroxide, sodium or potassium persulfate, redox catalysts and azo compounds, such as 2,2-azobis(N,N-dimethyleneisobutyramidine) dihydrochloride, 2,2-azobis(4-methoxy-2,4-dimethylvaleronitrile), 2,2-azobis(2,4-dimethylvaleronitrile) and 2,2-azobis(2-amidinopropane) dihydrochloride. The initiators are used in the amounts customary in the polymerization. Preferably used polymerization initiators are azo initiators. However, the polymerization can also be initiated with the aid of high-energy beams, such as electron beams, or by irradiation with UV light.

The aqueous dispersions of the water-soluble anionic polymers have a polymer concentration of anionic polymers of, for example, from 1 to 70% by weight, usually from 5 to 50, preferably from 10 to 25 and particularly preferably from 15 to 20, % by weight. According to the invention, they comprise at least two different groups of the abovementioned polymers (a) and (b) for stabilizing the anionic polymers formed in the polymerization. The amount of stabilizers (a) and (b) in the aqueous dispersion is, for example, from 1 to 40% by weight, usually from 5 to 30% by weight and preferably from 10 to 25% by weight. The aqueous dispersions have, for example, viscosities of from 200 to 100 000, preferably from 200 to 20 000, preferably from 200 to 10 000, mPa·s as measured in a Brookfield viscometer at 20° C., spindle 6, 100 rpm) at pH of 2.5.

The stabilizers of group (a) include graft polymers of vinyl acetate and/or vinyl propionate on (i) polyethylene glycols or vii) polyethylene or polypropylene glycols blocked at one or both terminal groups with alkyl, carboxyl or amino groups, and also polyalkylene glycols and polyalkylene glycols blocked at one or both terminal groups with alkyl, carboxyl or amino groups.

Polyalkylene glycols are described for example in WO-A 03/046024 page 4 line 37 to page 8 line 9. The polyalkylene glycols described therein can either be used directly as a stabilizer of group (a) or modified to the effect that for example from 10 to 1000, preferably from 30 to 300 parts by weight of vinyl acetate and/or vinylpropionate are grafted onto 100 parts by weight of the polyalkylene glycols. It is preferable to use polyethylene glycol having a molecular weight $M_N$ in the range from 1000 to 100 000 as the grafting base and to graft it with vinyl acetate.

Useful stabilizers (a) further include the abovementioned polyalkylene glycols and also the polyalkylene glycols blocked at one or both terminal groups with alkyl, carboxyl or amino groups. The abovementioned polymers have for example molar masses $M_N$ of from 100 to 100 000, preferably of from 300 to 80 000, particularly preferably of from 600 to 50 000 and in particular of from 1000 to 50 000. Such polymers are described, for example, in the above-cited WO-A 03/046024 page 4 line 37 to page 8 line 9. Preferred polyalkylene glycols are for example polyethylene glycol, polypropylene glycol and block copolymers of ethylene oxide and propylene oxide. The block copolymers may comprise ethylene oxide and propylene oxide in any desired amounts and incorporated in the form of polymerized units in any desired sequence. The terminal OH groups of the polyalkylene glycols can if appropriate be blocked with alkyl, carboxyl or amino groups at one or both ends, preferably with a methyl group.

Particularly preferred stabilizers in group (a) are copolymers of ethylene oxide and propylene oxide. Especial preference is given to block copolymers of ethylene oxide and propylene oxide having a molar mass $M_N$ of from 500 to 20 000 g/mol and an ethylene oxide unit content of from 10 to 80 mol %.

The water-soluble polymers of group (a) are used for example in amounts from 1% to 39.5% by weight, preferably from 5% to 30% by weight and more preferably from 10% to 25% by weight, based on the total dispersion, in the preparation of the dispersions.

Water-soluble copolymers of
(b1) water-soluble nonionic monoethylenically unsaturated monomers,
(b2) water-soluble cationic monoethylenically unsaturated monomers and if appropriate
(b3) water-soluble anionic monoethylenically unsaturated monomers, the fraction of the interpolymerized cationic monomers being greater than that of the anionic monomers,
are used as polymers of group (b).

Examples of water-soluble nonionic monomers (b1) are acrylamide, methacrylamide, N-vinylformamide, N-vinylpyrrolidone and N-vinylcaprolactam. All nonionic monoethylenically unsaturated monomers having a water solubility of at least 100 g/l at a temperature of 20° C. are in principle useful as monomers of group (b1). Particular preference is given to monomers (b1) which are miscible with water in any proportion and form clear aqueous solutions such as acrylamide or N-vinylformamide.

Water-soluble cationic monoethylenically unsaturated monomers (b2) are for example dialkylaminoalkyl (meth) acrylates such as dimethylaminoethyl acrylate, dimethylaminoethyl methacrylate, diethylaminoethyl acrylate, diethylaminoethyl methacrylate, dimethylaminopropyl acrylate, dimethylaminopropyl methacrylate, diethylaminopropyl acrylate and diethylaminopropyl methacrylate, dialkyldiallylammonium halides such as dimethyldiallylammonium chloride and diethyldiallylammonium chloride, N-vinylimidazole and quaternized N-vinylimidazole. Basic monomers such as dimethylaminoethyl acrylate or dimethylaminoethyl methacrylate can be used not only in the form of the free bases but also when partially or fully neutralized with acids such as hydrochloric acid, sulfuric acid, formic acid and p-toluenesulfonic acid. The basic monomers can also be partially or fully quaternized with $C_1$- to $C_{18}$-alkyl halides and/or $C_1$- to $C_{18}$-alkyl $C_1$- to $C_{18}$-alkylaryl halides and be used in the polymerization in that form. Examples thereof are the fully methyl chloride-quaternized dimethylaminoethyl (meth) acrylates such as dimethylaminoethyl acrylate methochloride or dimethylaminoethyl methacrylate methochloride. The polymers of group (b) can also comprise vinylamine units as cationic group. Such polymers are obtainable for example by polymerizing N-vinylformamide if appropriate together with at least one anionic water-soluble monomer and subsequently hydrolyzing the polymers, with partial detachment of formyl groups, to polymers comprising vinylamine units.

The polymers of group (b) may if appropriate further comprise at least one anionic monoethylenically unsaturated monomer (b3) in interpolymerized form. Examples of such monomers are the abovementioned anionic monomers which form water-soluble polymers such as acrylic acid, methacrylic acid, vinylsulfonic acid, vinylphosphonic acid, maleic acid, fumaric acid, crotonic acid, itaconic acid and also the alkali metal and ammonium salts thereof.

Examples of copolymers of group (b) are water-soluble copolymers of
(b1) acrylamide, methacrylamide, N-vinylformamide, N-vinylpyrrolidone and/or N-vinylcaprolactam,
(b2) dialkylaminoalkyl acrylate, dialkylaminoalkyl methacrylate, partially or fully neutralized dialkylaminoalkyl (meth)acrylates, quaternized dialkylaminoalkyl (meth) acrylates, dialkyldiallylammonium halides, N-vinylimidazole and quaternized N-vinylimidazole and if appropriate (b3) acrylic acid, methacrylic acid, vinylsulfonic acid, vinylphosphonic acid, maleic acid, fumaric acid, crotonic acid, itaconic acid and also the alkali metal and ammonium salts thereof.

The water-soluble polymers (b) comprise for example (b1) from 2 to 90, preferably from 20 to 80 and more preferably from 35 to 70 mol % of at least one nonionic monomer (b2) from 2 to 90, preferably from 20 to 80 and more preferably from 35 to 70 mol % of at least one cationic monomer and (b3) from 0 to 48.9 mol %, preferably from 0 to 30 and more preferably from 0 to 10 mol % of at least one anionic monomer in interpolymerized form, the fraction of cationic monomer units being greater than that of anionic monomer units.

Individual examples of polymers (b) are copolymers of acrylamide and dimethylaminoethyl acrylate methochloride, copolymers of acrylamide and dimethylaminoethyl methacrylate methochloride, copolymers of acrylamide and dimethylaminopropyl acrylate methochloride, copolymers of methacrylamide and dimethylaminoethyl methacrylate methochloride, copolymers of acrylamide, dimethylaminoethyl acrylate methochloride and acrylic acid, copolymers of acrylamide, dimethylaminoethyl methacrylate methochloride and methacrylic acid and copolymers of acrylamide, dimethylaminoethyl acrylate methochloride and acrylic acid.

The K value of the polymers (b) is for example in the range from 15 to 200, preferably from 30 to 150 and more preferably from 45 to 110 (determined after H. Fikentscher, Cellulose-Chemie, Volume 13, 58-64 and 71-74 (1932) in 3% by weight aqueous sodium chloride solution at 25° C., a polymer concentration of 0.1% by weight and a pH of 7).

The amount of polymers of group (b) comprised in the aqueous dispersions of the present invention is for example in the range from 0.5% to 15% and preferably in the range from 1% to 10% by weight.

The aqueous dispersions of the anionic polymers preferably comprise, as a stabilizer, a combination of (a) at least one block copolymer of ethylene oxide and propylene oxide and (b) at least one copolymer of acrylamide and dimethylaminoethyl acrylate methochloride.

The copolymer (b) may if appropriate further comprise up to 5 mol % of acrylic acid in interpolymerized form.

The ratio of the components (a) and (b) in the stabilizer mixtures can be varied within wide limits. It can be for example in the range from 50:1 to 1:10. It is preferable to choose an (a):(b) ratio of not less than 1.5:1 and especially in the range from 7:1 to 10:1.

The present invention furthermore relates to a process for the preparation of aqueous dispersions of water-soluble and/or water-swellable anionic polymers by free radical polymerization of ethylenically unsaturated anionic monomers in an aqueous medium in the presence of at least one stabilizer, the polymerization being carried out in the presence of at least one water-soluble polymer from the groups consisting of (a) graft polymers of vinyl acetate and/or vinyl propionate on (i) polyethylene glycols or (ii) polyethylene glycols or polypropylene glycols blocked at one or both terminal groups with alkyl carboxyl or amino groups, polyalkylene glycols, polyalkylene glycols blocked at one or both terminal groups with alkyl carboxyl or amino groups and (b) water-soluble copolymers of (b1) nonionic monoethylenically unsaturated monomers, (b2) cationic monoethylenically unsaturated monomers and if appropriate (b3) anionic monoethylenically unsaturated monomers, the fraction of the interpolymerized cationic monomers being greater than that of the anionic monomers, as a stabilizer.

Stable aqueous dispersions of anionic polymers having a particle size of from 0.1 to 200 μm, preferably from 0.5 to 70 μm, are obtained. The particle size can be determined for example by optical microscopy, light scattering or freeze fracture electron microscopy. The aqueous dispersions are produced for example at pH values in the range from 0.5 to 6 and preferably at pH values in the range from 1 to 3. At a pH below 6, dispersions having a content of from about 5 to 35% by weight of anionic polymers have a relatively low viscosity. However, if they are diluted to a content of less than 2% by weight of anionic polymers, the viscosity of the mixture increases sharply.

The present invention also provides for the use of the aqueous dispersions as thickeners for aqueous systems, for example as thickeners for paper coating slips, pigment print pastes, aqueous colors, cosmetic formulations, pharmaceutical articles of manufacture and agrochemicals. The aqueous dispersions of the present invention can also be used as coatings for substrates such as paper, wood, glass, metal and ceramic articles and also in washing and cleaning compositions. They are also useful as a matrix for the controlled release of active components in cosmetic or pharmaceutical formulations.

The aqueous dispersions of the anionic polymers are preferably used as thickeners, for example as an additive to paper coating slips, as thickeners for pigment print pastes and as an additive to water-based surface coatings, such as masonry coatings. They are also used in cosmetics, for example in cosmetic hair formulations, such as conditioners or hair setting compositions, or as thickeners for cosmetic formulations and for the surface treatment of leather. The aqueous dispersions of the anionic polymers can generally be used as rheology modifiers of preparations such as for example pigment print pastes or cosmetic formulations.

A special application form of the novel aqueous dispersions of the anionic polymer is the production of printed flexible substrates and in particular printed textile, also referred to below as textile printing process.

For carrying out the textile printing process, for example, it is possible to adopt a procedure in which at least one novel aqueous dispersion is processed to give a pigment print paste, and textile substrates are then printed by methods known per se.

Advantageously, such pigment print pastes are prepared by mixing at least one novel aqueous dispersion with assistants customary in the printing process and at least one pigment. The depth of color is advantageously established by tailoring the ratio of pigment to aqueous dispersion used according to the invention.

The pigments are added to the pigment print pastes preferably in the form of pigment formulations. Pigment formulations usually comprise from 20 to 60% by weight of pigment and furthermore water and one or more surface-active compounds, for example one or more emulsifiers, polyalkoxylated $C_{10}$-$C_{30}$-alkanols being mentioned by way of example.

In the context of the present invention, pigments are to be understood as meaning virtually insoluble, dispersed finely divided, organic or inorganic colorants according to the definition in DIN 55944. At least one organic pigment and/or metal pigment is preferably chosen.

Examples of organic pigments are

Monoazo pigments: C.I. Pigment Brown 25; C.I. Pigment Orange 5, 13, 36 and 67; C.I. Pigment Red 1, 2, 3, 5, 8, 9, 12, 17, 22, 23, 31, 48:1, 48:2, 48:3, 48:4, 49, 49:1, 52:1, 52:2, 53, 53:1, 53:3, 57:1, 63, 112, 146, 170, 184, 210, 245 and 251; C.I. Pigment Yellow 1, 3, 73, 74, 65, 97, 151 and 183;

Disazo pigments: C.I. Pigment Orange 16, 34 and 44; C.I. Pigment Red 144, 166, 214 and 242; C.I. Pigment Yellow 12, 13, 14, 16, 17, 81, 83, 106, 113, 126, 127, 155, 174, 176 and 188;

Anthanthrone pigments: C.I. Pigment Red 168 (C.I. Vat Orange 3);

Anthraquinone pigments: C.I. Pigment Yellow 147 and 177; C.I. Pigment Violet 31;

Anthraquinone pigments: C.I. Pigment Yellow 147 and 177; C.I. Pigment Violet 31;

Anthrapyrimidine pigments: C.I. Pigment Yellow 108 (C.I. Vat Yellow 20);

Quinacridone pigments: C.I. Pigment Red 122, 202 and 206; C.I. Pigment Violet 19;

Quinophthalone pigments: C.I. Pigment Yellow 138;

Dioxazine pigments: C. Pigment Violet 23 and 37;

Flavanthrone pigments. C.I. Pigment Yellow 24 (C.I. Vat Yellow 1;

Indanthrone pigments: C.I. Pigment Blue 60 (C.I. Vat Blue 4) and 64 (C.I. Vat Blue 6);

Isoindoline pigments: C.I. Pigment Orange 69; C.I. Pigment Red 260;

C.I. Pigment Yellow 139 and 185;

isoindolinone pigments: C.I. Pigment Orange 61; C.I. Pigment Red 257 and 260;

C.I. Pigment Yellow 109, 110, 173 and 185;

Isoviolanthrone pigments: C.I. Pigment Violet 31 (C.I. Vat Violet 1);

Metal complex pigments: C.I. Pigment Yellow 117, 150 and 153; C.I. Pigment Green 8;

Perinone pigments: C.I. Pigment Orange 43 (C.I. Vat Orange 7); C.I. Pigment Red 194 (C.I. Vat Red 15);

Perylene pigments: C.I. Pigment Black 31 and 32; C.I. Pigment Red 123, 149, 178, 179 (C.I. Vat Red 23), 190 (C.I. Vat Red 29) and 224; C.I. Pigment Violet 29;

Phthalocyanine pigments: C.I. Pigment Blue 15, 15:1, 15:2, 15:3, 15:4, 15:6 and 16; C.I. Pigment Green 7 and 36;

Pyranthrone pigments: C.I. Pigment Orange 51; C.I. Pigment Red 216 (C.I. Vat Orange 4);

Thioindigo pigments: C.I. Pigment Red 88 and 181 (C.I. Vat Red 1); C.I. Pigment Violet 38 (C.I. Vat Violet 3);

Triarylcarbonium pigments: C.I. Pigment Blue 1, 61 and 62; C.I. Pigment Green 1; C.I. Pigment Red 81, 81:1 and 169; C.I. Pigment Violet 1, 2, 3 and 27;

C.I. Pigment Black 1 (aniline black);

C.I. Pigment Yellow 101 (aldazine yellow);

C.I. Pigment Brown 22.

Examples of particularly preferred pigments are: C.I. Pigment Yellow 138; C.I. Pigment Red 122, C.I. Pigment Violet 19, C.I. Pigment Blue 15:3 and 15:4; C.I. Pigment Black 7, C.I. Pigment Orange 5, 38 and 43 and C.I. Pigment Green 7.

Further suitable pigments are metallic pigments, for example gold bronze, silver bronze, iriodine pigments and glitter.

The mean diameter of pigments used is usually from 20 nm to 1.5 μm, preferably from 300 to 500 nm.

Binders which may be used are all binders customary in textile printing, for example binders based on polyurethanes and preferably acrylate-based binders (acrylate binders). Acrylate-based binders are typically copolymers of (meth) acrylic acid with one or more $C_1$-$C_{10}$-alkyl (meth)acrylates and, if required, further comonomers, for example (meth) acrylonitrile and styrene, it being possible for the (meth) acrylic acid to be partially or completely neutralized with, for example, alkali metal hydroxide or ammonia.

The binders, in particular acrylate-based binders, have for example a glass transition temperature Tg of at least 0° C., determined, for example, according to the Fox equation or determined by DSC differential scanning calorimetry).

The ratio of pigment to binder may be chosen within wide limits. For example, it is possible to choose pigment and binder in a weight ratio of from 20:1 to 1:100. In a preferred embodiment of the present invention, the ratio of pigment to aqueous dispersion used according to the invention is established so that the weight ratio of pigment to solid fractions of aqueous dispersion used according to the invention is from 1:1 to 1:20.

It is of course also possible first to premix pigment and binder in a weight ratio of from 20:1 to 10:1 and to admix further binder only directly before printing.

Further conventional assistants for pigment print pastes in textile printing are disclosed in Ullmann, Handbuch der technischen Chemie und Verfahrenstechnik, cf. for example Ullmann's Encyclopedia of Industrial Chemistry, 5th edition, keyword: textile auxiliaries, vol. A26, page 286 et seq. and 296 et seq., Verlag Chemie, Weinheim, Deerfield/Fla., Basel; 1996, and in Textil-Hilfsmittel-Katalog, Konradin Verlag Robert Kohlhammer GmbH, D-70771 Leinfelden-Echterdingen. Thickeners, fixing agents, hand improvers, antifoams, rheology enhancers, acid donors and emulsifiers may be mentioned by way of example as conventional assistants:

In a preferred embodiment of the present invention, pigment print pastes furthermore comprise hand improvers, selected from silicones, in particular polydimethylsiloxanes, and $C_1$-$C_{10}$-alkyl esters of fatty acids. Examples of commercially available hand improvers which may be added to the novel pigment print pastes are Acramin® Softener SI (Bayer AG), Luprimol SIG®, Luprimol TX 4732 and Luprimol CW® (BASF Aktiengesellschaft).

In a preferred embodiment of the present invention, the pigment print pastes comprise, as further additives, one or more emulsifiers. Examples of suitable emulsifiers are aryl- or alkyl-substituted polyglycol ethers. Commercially available examples of suitable emulsifiers are Emulgator W® (Bayer), Luprintol PE New® and Luprintol MP® (BASF Aktiengesellschaft).

For the preparation of pigment print pastes, for example, water, if appropriate an antifoam, for example a silicone-based antifoam, can be stirred, and at least one binder can be added with further mixing. One or more emulsifiers and at least one pigment can then be added. A further constituent of a pigment print paste may be a hand improver, which is added next in the production of a pigment print paste. Useful hand improvers are for example silicone emulsions. Then at least one aqueous dispersion according to the present invention is added and the mixture is homogenized, for example by stirring.

A typical pigment print paste comprises, in each case per kilogram of pigment print paste, from 5 to 400 g, preferably from 10 to 250 g, of binder, for example acrylate binder, from 0 to 100 g, preferably from 1 to 5 g, of emulsifier,
from 1 to 500 g, preferably from 1.5 to 75 g, of the novel aqueous dispersions,
from 0 to 500 g, preferably from 0.1 to 250 g, preferably from 0.5 to 120 g of at least one pigment, if required, further assistants; the remainder preferably being water.

In an embodiment of the present invention, pigment print pastes have a viscosity of from 3 to 40 000, preferably from 200 to 2000, particularly preferably from 600 to 1000, mPa·s at 20° C. The viscosities can be determined by conventional methods, in particular, for example, using a rotational viscometer, for example the Viscotester VT02 or VT24 from Haake Mess-Technik GmbH u. Co., Karlsruhe.

Pigment printing with the use of at least one pigment print paste can be carried out by various methods which are known per se. It is usual to use a template through which the novel pigment print paste is pressed by means of a knife coater. This method is a screenprinting method. Pigment printing methods with the use of at least one pigment print paste give printed substrates having excellent handle. The present invention therefore relates to flexible substrates and in particular textiles printed by the printing process using at least one pigment print paste.

For carrying out the pigment printing process, textile is preferably printed with at least one pigment print paste and the latter is subsequently dried thereon. Particularly preferred is a method in which the substrate printed with the print paste is predried, for example to a residual moisture content of from 0.5 to 2% by weight, before the actual drying. The predrying or drying can be carried out on conventional apparatuses. For example, if it is desired to treat textile substrates, it can be carried out on all fixing and drying units customary in the textile industry. Suitable drying and predrying temperatures are, for example, from 50 to 300° C., preferably from 70 to 180° C.

Thermal treatment can then be effected over a period of, for example from 10 seconds to 60 minutes, preferably from 0.5 minute to 7 minutes, at from 50 to 300° C., preferably from 100 to 160° C., particularly preferably from 110 to 130° C. Polyamide, polyester, polyvinyl chloride, modified polyesters, polyester blended fabric, polyamide blended fabric, polyacrylonitrile and polycarbonate are thermally treated advantageously at from 130 to 250° C., polypropylene fabric is for example thermally treated at from 80 to 130° C., preferably from 110 to 130° C. Here, the temperature is generally to be understood as meaning the temperature of the medium which surrounds the flexible substrate to be treated.

The K values of the polymers were determined according to H. Fikentscher, Cellulose-Chemie, Volume 13, 58-64 and 71-74 (1932) in 3% strength by weight aqueous sodium chloride solution at 25° C., and at a concentration of 0.1% by weight.

The viscosity of the dispersions was measured in each case in a Brookfield viscometer using a spindle No, 4 at 20 rpm and at 20° C. Unless stated otherwise, the data in % are by weight. The particle sizes were determined by optical microscopy.

EXAMPLES

The following stabilizers were used in the examples to produce the aqueous dispersions of the present invention:
Stabilizer 1
  copolymer of 50 mol % acrylamide and 50 mol % dimethylaminoethyl acrylate methochloride, K value of copolymer: 82.6, polymer content 22.37%
Stabilizer 2
  copolymer of 50 mol % acrylamide and 45 mol % dimethylaminoethyl acrylate methochloride, 5 mol % acrylic acid, K value of copolymer: 45.1, polymer content 20.55%
Stabilizer 3
  copolymer of 60 mol % acrylamide and 38 mol % dimethylaminoethyl acrylate methochloride, 2 mol % acrylic acid, K value of copolymer: 78.0, polymer content 21.46%

The azo initiators reported in the examples have the following composition:
Azo initiator VA-044: 2,2'-azobis(N,N'-dimethyleneisobutyramidine) dihydrochloride
Azo initiator V-70: 2,2'-azobis(4-methoxy-2,4-dim ethylvaeronitrile)
Azo initiator V-65: 2,2'-azobis(2,4-dimethylvaleronitrile)

Example 1

A 2 l glass reactor equipped with an anchor stirrer and an apparatus for working under nitrogen was charged with 600.59 g of distilled water, 160 g of a block copolymer of ethylene oxide (EO) and propylene oxide (PO) having an EO content of 40% and a molar mass of 1750 g/mol for the polypropylene glycol block (Pluronic® PE 6400) and 89.41 g of stabilizer 1 while nitrogen was passed through. 150 g of acrylic acid were then added dropwise in the course of 10 minutes at room temperature with stirring at 200 rpm. Following addition of 0.2 g of V-65 azo initiator, the reaction mixture was heated to an internal temperature of 40° C. and maintained at this temperature. After 1 hour, a further 0.3 g of the V-65 azo initiator and after 5 hours 0.4 g of VA-044 azo initiator were added to obtain a milky white dispersion having a viscosity of 650 mPas (spindle 4, 20 rpm).

A 2% aqueous polyacrylic acid solution had a viscosity of 550 mPas (spindle 4, 20 rpm) after pH adjustment to 7 with triethanolamine.

Example 2

A 2 l glass reactor equipped with an anchor stirrer and an apparatus for working under nitrogen was charged with 575.55 g of distilled water, 160 g of a block copolymer of ethylene oxide (EO) and propylene oxide (PO) having an EO content of 40% and a molar mass of 1750 g/mol for the polypropylene glycol block (Pluronic® PE 6400) and 89.41 g of stabilizer 1 while nitrogen was passed through. 175 g of acrylic acid were then added dropwise in the course of 10 minutes at room temperature with stirring at 200 rpm. After addition of 0.3 g of VA-044 azo initiator, the reaction mixture was heated to an internal temperature of 40° C. and maintained at this temperature to the end of the polymerization to obtain a milky white dispersion having a viscosity of 1550 mPas (spindle 4, 20 rpm). The dispersed particles had a particle size in the range from 5 to 10 µm with individual larger particles up to 50 µm.

A 2% aqueous polyacrylic acid solution had a viscosity of 600 mPas (spindle 4, 20 rpm) after pH adjustment to 7 with triethanolamine.

Example 3

A 2 l glass reactor equipped with an anchor stirrer and an apparatus for working under nitrogen was charged with 560.59 g of distilled water, 175 g of a block copolymer of ethylene oxide (EO) and propylene oxide (PO) having an EO content of 40% and a molar mass of 1750 g/mol for the polypropylene glycol block (Pluronic® PE 6400) and 89.41 g of stabilizer 1 while nitrogen was passed through. 175 g of acrylic acid and 0.875 g of triallylamine were then added dropwise in the course of 10 minutes at room temperature with stirring at 200 rpm. After addition of 0.3 g of VA-044 azo initiator, the reaction mixture was heated to an internal temperature of 40° C. and maintained at this temperature to the end of the polymerization to obtain a milky white dispersion having a viscosity of 4000 mPas (spindle 4, 20 rpm). The dispersed polymer had a particle size in the range from 5 to 10 µm with individual larger particles of up to 40 µm.

A 1% aqueous polyacrylic acid solution had a viscosity of 11 600 mPas (spindle 6, 20 rpm) after pH adjustment to 7 with triethanolamine.

Example 4

A 2 l glass reactor equipped with an anchor stirrer and an apparatus for working under nitrogen was charged with 560.59 g of distilled water, 175 g of a block copolymer of EO and PO having an EO content of 30% and a molar mass of 1100 g/mol for the polypropylene glycol block (Pluronic® PE 4300) and 89.41 g of stabilizer 1 while nitrogen was passed through. 175 g of acrylic acid and 0.875 g of triallylamine were then added dropwise in the course of 10 minutes at room temperature with stirring at 200 rpm. After addition of 0.3 g of VA-044 azo initiator, the mixture was heated to an internal temperature of 40° C. and maintained at this temperature to the end of the polymerization to obtain a milky white dispersion having a viscosity of 6700 mPas (spindle 5, 20 rpm).

A 1% aqueous polyacrylic acid solution had a viscosity of 11 500 mPas (spindle 6, 20 rpm) after pH adjustment to 7 with triethanolamine.

Example 5

A 2 l glass reactor equipped with an anchor stirrer and an apparatus for working under nitrogen was charged with 560.59 g of distilled water, 175 g of a block copolymer of EO and PO having an EO content of 30% and a molar mass of 1100 g/mol for the polypropylene glycol block (Pluronic® PE 4300) and 859.41 g of stabilizer 1 while nitrogen was passed through. 173.55 g of acrylic acid and 1.75 q of triallylamine were then added dropwise in the course of 10 minutes at room temperature with stirring at 200 rpm. After addition of 0.3 g of VA-044 azo initiator, the mixture was heated to an internal temperature of 400 and maintained at this temperature to the end of the polymerization to obtain a milky white dispersion having a viscosity of 16 000 mPas (spindle 4, 20 rpm). The dispersed polymer particles had a particle size in the range from 5 to 10 µm.

A 1% aqueous polyacrylic acid solution had a viscosity of 21 000 mPas (spindle 6, 20 rpm) after pH adjustment to 7 with triethanolamine.

Example 6

A 2 l glass reactor equipped with an anchor stirrer and an apparatus for working under nitrogen was charged with 515.88 g of distilled water, 175 g of a block copolymer of EO and PO having an EO content of 30% and a molar mass of 1100 g/mol for the polypropylene glycol block (Pluronic® PE 4300) and 134.12 g of stabilizer 1 while nitrogen was passed through. 173.55 g of acrylic acid and 1.75 g of triallylamine were then added dropwise in the course of 10 minutes at room temperature with stirring at 200 rpm. After addition of 0.3 g of VA-044 azo initiator, the reaction mixture was heated to an internal temperature of 40° C. and maintained at this temperature to the end of the polymerization to obtain a milky white thixotropic dispersion. The dispersion has a particle size in the range from 8 to 20 µm.

A 1% aqueous polyacrylic acid solution had a viscosity of 34 000 mPas (spindle 6, 20 rpm) after pH adjustment to 7 with triethanolamine.

Example 7

A 2 l glass reactor equipped with an anchor stirrer and an apparatus for working under nitrogen was charged with 552.38 g of distilled water, 175 g of a block copolymer of EO and PO having an EO content of 30% and a molar mass of 1100 g/mol for the polypropylene glycol block (Pluronic® PE 4300) and 97.32 g of stabilizer 2 while nitrogen was passed through, 173.55 g of acrylic acid and 1.75 g of triallylamine were then added dropwise in the course of 10 minutes at room temperature with stirring at 200 rpm. After addition of 0.3 g of VA-044 azo initiator the mixture was heated to an internal temperature of 40° C. and maintained at this temperature to the end of the polymerization to obtain a milky white dispersion having a viscosity of 42 000 mPas (spindle 4, 20 rpm). The dispersed polymer particles had a particle size in the range from 5 to 10 µm.

A 1% aqueous polyacrylic acid solution had a viscosity of 13 000 mPas spindle 6, 20 rpm) after pH adjustment to 7 with triethanolamine.

Example 8

A 2 l glass reactor equipped with an anchor stirrer and an apparatus for working under nitrogen was charged with 560.59 g of distilled water, 175 g of a block copolymer of EO and PO having an EO content of 30% and a molar mass of 1100 g/mol for the polypropylene glycol block (Pluronic® PE 4300) and 89.41 g of stabilizer 1 while nitrogen was passed through, 173.25 g of acrylic acid and 1.75 g of N,N'-divinylethyleneurea were then added dropwise in the course of 10 minutes at room temperature with stirring at 200 rpm. After addition of 0.3 g of VA-044 azo initiator, the mixture was heated to an internal temperature of 40° C. and maintained at this temperature to the end of the polymerization to obtain a milky white dispersion having a viscosity of 4950 mPas (spindle 4, 20 rpm). The dispersion had a particle size in the range from 5 to 10 µm.

A 1% aqueous polyacrylic acid solution had a viscosity of 3000 mPas (spindle 6, 100 rpm) after pH adjustment to 7 with triethanolamine.

Example 9

A 2 l glass reactor equipped with an anchor stirrer and an apparatus for working under nitrogen was charged with 556.5 g of distilled water, 175 g of a block copolymer of EO and PO having an EO content of 30% and a molar mass of 1100 g/mol for the polypropylene glycol block (Pluronic® PE 4300) and 93.2 g of stabilizer 3 while nitrogen was passed through. 172.5 g of acrylic acid and 1.25 g of pentaerythrityl triallyl ether (70% strength) were then added dropwise in the course of 10 minutes at room temperature with stirring at 200 rpm. After addition of 0.3 g of VA-044 azo initiator, the reaction mixture was heated to an internal temperature of 40° C. and maintained at this temperature to the end of the polymerization to obtain a milky white dispersion having a viscosity of 13 000 mPas (spindle 5, 20 rpm, 30° C.). The dispersed polymer particles of the dispersion had a particle size in the range from 15 to 35 µm.

A 0.25% aqueous polyacrylic acid solution had a viscosity of 12 000 mPas (spindle 7, 10 rpm) after pH adjustment to 7 with triethanolamine.

Example 10

A 2 l glass reactor equipped with an anchor stirrer and an apparatus for working under nitrogen was charged with 556.5 g of distilled water, 175 g of a block copolymer of EO and PO having an EO content of 30% and a molar mass of 1100 g/mol for the polypropylene glycol block (Pluronic® PE 4300) and 93.2 g of stabilizer 3 while nitrogen was passed through. 174 g of acrylic acid and 1.0 g of pentaerythrityl triallyl ether (70% strength) were then added dropwise in the course of 10 minutes at room temperature with stirring at 200 rpm. After addition of 0.2 g of VA-044 azo initiator, the reaction mixture was heated to an internal temperature of 40° C. and maintained at this temperature to the end of the polymerization. After the polymerization had ended, 0.4 g of VA-044 azo initiator was added for after polymerization to obtain a milky white dispersion having a viscosity of 68 000 mPas (spindle 4, 2.5 rpm). The dispersion had a particle size in the range from 6 to 30 µm.

A 0.5% aqueous polyacrylic acid solution had a viscosity of 33 000 mPas (spindle 7, 20 rpm) after pH adjustment to 7 with triethanolamine.

Example 11

A 2 l glass reactor equipped with an anchor stirrer and an apparatus for working under nitrogen was charged with 560.39 g of distilled water, 175 g of a block copolymer of EO and PO having an EO content of 30% and a molar mass of 1100 g/mol for the polypropylene glycol block (Pluronic® PE 4300) and 89.41 g of stabilizer 1 while nitrogen was passed through. 174 g of acrylic acid and 1.0 g of pentaerythrityl triallyl ether (70% strength) were then added dropwise in the course of 10 minutes at room temperature with stirring at 200 rpm. After addition of 0.2 g of VA-044 azo initiator, the reaction mixture was heated to an internal temperature of 40° C. and maintained at this temperature to the end of the polymerization. After the actual polymerization had ended, 0.4 g of VA-044 azo initiator was added for supplementary polymerization to obtain a milky white dispersion having a viscosity of 15 400 mPas (spindle 4, 10 rpm). The dispersion had a particle size in the range from 6 to 30 µm.

A 0.5% aqueous polyacrylic acid solution had a viscosity of 30 000 mPas (spindle 7, 20 rpm) after pH adjustment to 7 with triethanolamine.

We claim:

1. An aqueous dispersion comprising water-soluble and/or water-swellable anionic polymers of ethylenically unsaturated, anionic monomers; an aqueous medium; and a stabilizer comprising:
   (a) at least one water-soluble polymer selected from the groups consisting of
      graft polymers of vinyl acetate and/or vinyl propionate on (i) polyethylene glycols or (ii) polyethylene glycols or polypropylene glycols blocked at one or both terminal groups with alkyl, carboxyl or amino groups, polyalkylene glycols, polyalkylene glycols blocked at one or both terminal groups with alkyl, carboxyl or amino groups and
   (b) at least one water-soluble copolymer comprising
      (b1) nonionic monoethylenically unsaturated monomers,
      (b2) cationic monoethylenically unsaturated monomers and optionally
      (b3) anionic monoethylenically unsaturated monomers, the fraction of the interpolymerized cationic monomers being greater than that of the anionic monomers.

2. An aqueous dispersion as claimed in claim 1, wherein polyalkylene glycols having molar masses $M_N$ of from 100 to 100 000 and/or polyalkylene glycols blocked at one or both terminal groups with alkyl, carboxyl or amino groups and having molar masses $M_N$ of from 100 to 100 000 are used as water-soluble polymers of group (a).

3. An aqueous dispersion as claimed in claim 1, wherein block copolymers of ethylene oxide and propylene oxide having a molar mass $M_N$ of from 500 to 20 000 g/mol and an ethylene oxide unit content of from 10 to 80 mol % are used as water-soluble polymers of group (a).

4. An aqueous dispersion as claimed in claim 1, wherein copolymers of
   (b1) acrylamide, methacrylamide, N-vinylformamide, N-vinylpyrrolidone and/or N-vinylcaprolactam,
   (b2) dialkylaminoalkyl acrylate, dialkylaminoalkyl methacrylate, partially or fully neutralized dialkylaminoalkyl (meth)acrylates, quaternized dialkylaminoalkyl (meth)acrylates, dialkyldiallylammonium halides, N-vinylimidazole and quaternized N-vinylimidazole and optionally
   (b3) acrylic acid, methacrylic acid, vinylsulfonic acid, vinylphosphonic acid, maleic acid, fumaric acid, crotonic acid, itaconic acid and also the alkali metal and ammonium salts thereof,
are used as water-soluble polymers of group (b).

5. An aqueous dispersion as claimed in claim 1, wherein stabilizer comprises
   (a) at least one block copolymer of ethylene oxide and propylene oxide and
   (b) at least one copolymer of acrylamide and dimethylaminoethyl acrylate methochloride, which copolymer may optionally further comprise up to 5 mol % of acrylic acid in interpolymerized form.

6. An aqueous dispersion as claimed in claim 1, wherein monoethylenically unsaturated $C_3$- to $C_5$-carboxylic acids, vinylsulfonic acid, styrenesulfonic acid, acrylamidomethylpropanesulfonic acid, vinylphosphonic acid and/or the alkali metal or ammonium salts thereof are used as anionic monomers.

7. An aqueous dispersion as claimed in claim 1, wherein said water-soluble and/or water-swellable anionic polymers further comprise at least one other polymerized monomer from the group consisting of acrylamide, methacrylamide, acrylic esters of monohydric alcohols of 1 to 20 carbon atoms, methacrylic esters of monohydric alcohols of 1 to 20 carbon atoms, vinyl acetate, vinyl propionate, dialkylaminoethyl (meth)acrylates, dialkylaminopropyl (meth)acrylates, diallyldimethylammonium chloride, vinylimidazole and quaternized vinylimidazole and also partially or fully acid-neutralized or quaternized dialkylaminoalkyl (meth)acrylates.

8. An aqueous dispersion as claimed in claim 1, wherein said water-soluble and/or water-swellable anionic polymer is crosslinked with at least one crosslinking agent.

9. An aqueous dispersion as claimed in claim 8, wherein the crosslinker used is pentaerythritol triallyl ether, N,N'-divinylethyleneurea, at least doubly allyl-comprising allyl ethers of sugars, at least doubly vinyl-comprising vinyl ethers or triallylamine and also mixtures thereof.

10. An aqueous dispersion as claimed in claim 1, wherein said ethylenically unsaturated, anionic monomers comprise acrylic acid.

11. An aqueous dispersion as claimed in claim 1, wherein said ethylenically unsaturated, anionic monomers comprise acrylic acid and/or methacrylic acid in the presence of penterythritol triallyl ether, N,N'-divinylethyleneurea or triallylamine and also mixtures thereof.

12. A process for the preparation of the aqueous dispersions of claim 1, comprising free radical polymerizing of ethylenically unsaturated, anionic monomers in an aqueous medium in the presence of a stabilizer comprising
   (a) at least one water-soluble polymer selected from the groups consisting of graft polymers of vinyl acetate and/or vinyl propionate on (i) polyethylene glycols or (ii) polyethylene glycols or polypropylene glycols blocked at one or both terminal groups with alkyl, carboxyl or amino groups, polyalkylene glycols, polyalkylene glycols blocked at one or both terminal groups with alkyl, carboxyl or amino groups and
   (b) at least one water-soluble copolymer comprising
      (b1) nonionic monoethylenically unsaturated monomers,
      (b2) cationic monoethylenically unsaturated monomers and
      (b3) anionic monoethylenically unsaturated monomers, the fraction of the interpolymerized cationic monomers being greater than that of the anionic monomers.

13. The method for thickening an aqueous system said method comprising using aqueous dispersion soluble polymer of claim 1.

14. The method of claim 13 wherein the aqueous dispersion is used as a thickener for paper coating slips, pigment print pastes aqueous colors, leather treatment compositions, cosmetic formulations, pharmaceutical articles of manufacture and agrochemicals.

15. The aqueous dispersion as claimed in claim 1, comprising 1-70 wt. % of said water-soluble and/or water-swellable anionic polymers.

16. The aqueous dispersion as claimed in claim 1, comprising 15-20 wt. % of said water-soluble and/or water-swellable anionic polymers.

17. The aqueous dispersion as claimed in claim 1, comprising 1 to 40 wt. % of stabilizers (a) and (b).

18. The aqueous dispersion as claimed in claim 1, comprising 10 to 25 wt. % of stabilizers (a) and (b).

19. The aqueous dispersion as claimed in claim 1, wherein said dispersion has a viscosity of from 200 to 100,000 mPa·s as measured in a Brookfield viscometer at 20° C.

20. The aqueous dispersion as claimed in claim 1, wherein said dispersion has a viscosity of from 200 to 10,000 mPa·s as measured in a Brookfield viscometer at 20° C.

* * * * *